United States Patent
Li et al.

(10) Patent No.: US 11,629,775 B2
(45) Date of Patent: Apr. 18, 2023

(54) PARAMETER SETTING METHOD AND CONTROL APPARATUS

(71) Applicant: FANUC CORPORATION, Yamanashi (JP)

(72) Inventors: Zhenxing Li, Yamanashi-ken (JP); Hiroshi Minami, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 471 days.

(21) Appl. No.: 17/008,989

(22) Filed: Sep. 1, 2020

(65) Prior Publication Data
US 2021/0062890 A1    Mar. 4, 2021

(30) Foreign Application Priority Data
Sep. 4, 2019  (JP) .............................. JP2019-161045

(51) Int. Cl.
  *F16F 15/02*   (2006.01)
  *F16F 15/027*  (2006.01)
  *F16F 15/00*   (2006.01)

(52) U.S. Cl.
  CPC .......... *F16F 15/022* (2013.01); *F16F 15/002* (2013.01); *F16F 15/027* (2013.01)

(58) Field of Classification Search
  None
  See application file for complete search history.

(56) References Cited

U.S. PATENT DOCUMENTS

| | | | | |
|---|---|---|---|---|
| 5,475,291 A | * | 12/1995 | Yoshida | G05B 19/409 318/632 |
| 5,656,906 A | * | 8/1997 | Iwashita | G05B 19/19 318/632 |
| 2003/0201745 A1 | * | 10/2003 | Hayashi | G05B 13/025 318/561 |
| 2015/0142182 A1 | | 5/2015 | Kimura et al. | |
| 2016/0070252 A1 | * | 3/2016 | Imada | H02P 29/40 318/561 |
| 2017/0176244 A1 | * | 6/2017 | Fujita | G01H 17/00 |
| 2018/0224810 A1 | * | 8/2018 | Murai | H02K 11/21 |
| 2018/0224824 A1 | * | 8/2018 | Murai | G05B 17/02 |
| 2019/0389023 A1 | * | 12/2019 | Kato | G05B 19/404 |

FOREIGN PATENT DOCUMENTS

JP         2014-43946 A    3/2014

* cited by examiner

*Primary Examiner* — Steven M Marsh
(74) *Attorney, Agent, or Firm* — Robert P. Michal, Esq.; Carter, DeLuca & Farrell LLP

(57) ABSTRACT

A parameter setting method includes a parameter value changing step of, when the magnitude of a deviation that is a difference between a command position and an actual position of a movable portion is greater than or equal to a prescribed value during operation of an active damper, selecting an unselected set of candidate values from among a plurality of sets of candidate values and changing the values of respective types of parameters of the active damper to the selected set of candidate values, and when the magnitude of the deviation is less than the prescribed value, not changing the values of the respective types of the parameters. After the parameter value changing step is finished, the parameter value changing step is repeated until the magnitude of the deviation becomes less than the prescribed value.

15 Claims, 5 Drawing Sheets

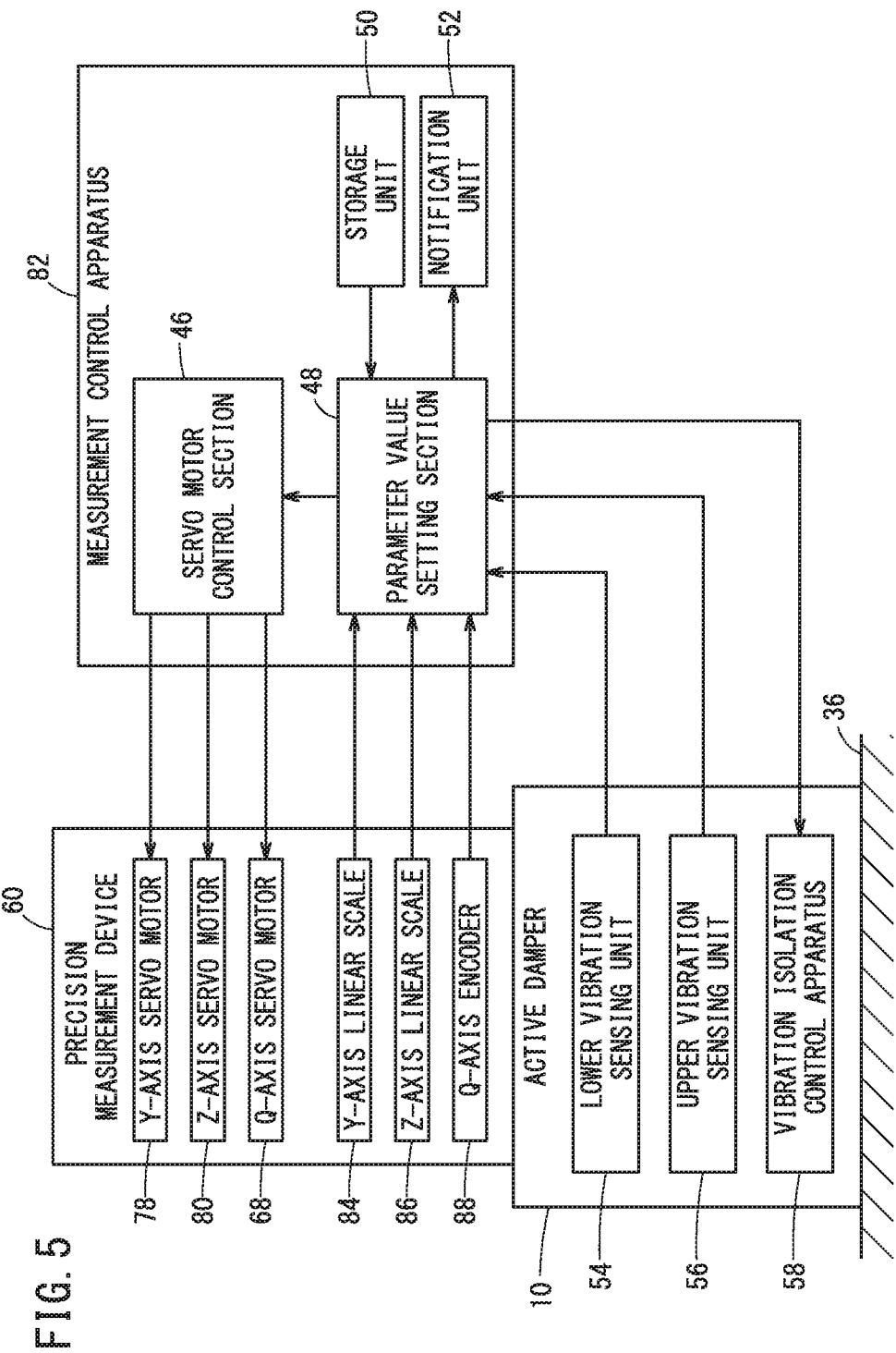

PARAMETER SETTING METHOD AND CONTROL APPARATUS

CROSS-REFERENCE TO RELATED APPLICATION

This application is based upon and claims the benefit of priority from Japanese Patent Application No. 2019-161045 filed on Sep. 4, 2019, the contents of which are incorporated herein by reference.

BACKGROUND OF THE INVENTION

Field of the Invention

The present invention relates to a parameter setting method for adjusting vibration isolation characteristics of a vibration isolation apparatus with a control apparatus, and to a control apparatus for a device that includes a movable portion that is driven, by a servo motor, on an axis disposed on the vibration isolation apparatus.

Description of the Related Art

Conventional technology has been disclosed for changing parameter values of a vibration isolation apparatus to adjust the vibration isolation characteristics (for example, see Japanese Laid-Open Patent Publication No. 2014-043946).

SUMMARY OF THE INVENTION

However, in the conventional technology, the parameters are adjusted in a manner to suppress vibration detected in the vibration isolation apparatus, and therefore it is not possible to sufficiently suppress vibration in a device disposed on the vibration isolation apparatus.

The present invention aims to solve this problem, and it is an object of the present invention to provide a parameter setting method and a control apparatus that can suppress vibration in a device disposed on a vibration isolation apparatus.

A first aspect of the present invention is a method of setting a parameter for adjusting vibration isolation characteristics of a vibration isolation apparatus, performed by a control apparatus, wherein a device that includes at least one axis and a movable portion driven by a servo motor on the axis is disposed on the vibration isolation apparatus, the control apparatus controls the device, and the control apparatus includes a storage unit configured to store a plurality of sets of candidate values of parameters for adjusting the vibration isolation characteristics of the vibration isolation apparatus, wherein each of the sets of candidate values contains candidate values of respective types of the parameters, the parameter setting method including a servo motor control step of controlling the servo motor to position the movable portion at a command position; and a parameter value changing step of, when the magnitude of a deviation that is a difference between the command position and an actual position of the movable portion is greater than or equal to a prescribed value during operation of the vibration isolation apparatus, selecting an unselected set of candidate values from among the plurality of sets of candidate values and changing the values of the respective types of the parameters of the vibration isolation apparatus to the selected set of candidate values, and when the magnitude of the deviation is less than the prescribed value, not changing the values of the respective types of the parameters, wherein, after the parameter value changing step is finished, the parameter value changing step is repeated until the magnitude of the deviation becomes less than the prescribed value.

A second aspect of the present invention is a control apparatus for a device that includes at least one axis disposed on a vibration isolation apparatus and a movable portion driven on the axis by a servo motor, the control apparatus including a storage unit configured to store a plurality of sets of candidate values of parameters for adjusting vibration isolation characteristics of the vibration isolation apparatus, wherein each of the sets of candidate values contains candidate values of respective types of the parameters; a servo motor control section configured to control the servo motor to position the movable portion at a command position; and a parameter value setting section configured to, when the magnitude of a deviation that is a difference between the command position and an actual position of the movable portion is greater than or equal to a prescribed value during operation of the vibration isolation apparatus, select an unselected set of candidate values from among the plurality of sets of candidate values and change the values of the respective types of the parameters of the vibration isolation apparatus to the selected set of candidate values and, when the magnitude of the deviation is less than the prescribed value, not change the values of the respective types of the parameters, wherein the parameter value setting section is configured to repeat changing of the values of the respective types of the parameters until the magnitude of the deviation becomes less than the prescribed value.

According to the present invention, it is possible to suppress the vibration in the device disposed on the vibration isolation apparatus.

The above and other features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a control block diagram of the precision measurement device, the active damper, and the numerical controller.

DESCRIPTION OF THE PREFERRED EMBODIMENTS

First Embodiment

[Overall Configuration]

Figure 1:
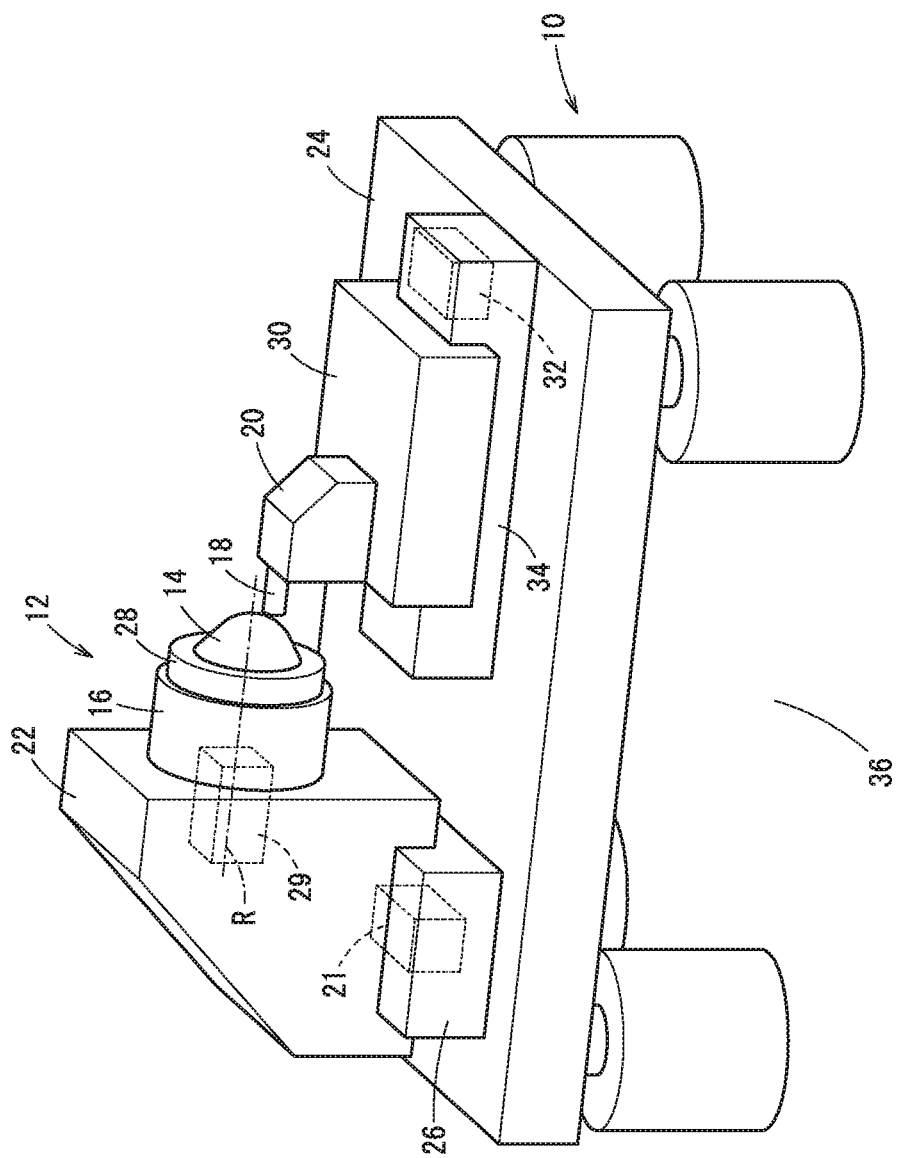
FIG. 1 is a schematic view of a precision processing machine that is disposed on an active damper.

FIG. 1 is a schematic view of a precision processing machine 12 (a device) disposed on an active damper 10.

The precision processing machine 12 is a processing machine that processes (machines) a workpiece 14 with a precision of 100 nm or less. The precision processing machine 12 includes a spindle 16 to which the workpiece 14 is fixed in an attachable/detachable manner and a tool rest 20 that to which a tool 18 is fixed in an attachable/detachable manner.

The spindle 16 is supported by an X-axis movable portion 22. The X-axis movable portion 22 is driven in an X-axis direction by an X-axis servo motor 21, along an X-axis guide 26 that is fixed to a base platform 24. A fluid bearing is provided between the X-axis guide 26 and the X-axis movable portion 22, so that there is only a small amount of friction between the X-axis guide 26 and the X-axis movable portion 22. The spindle 16 includes a vacuum chuck 28, and the workpiece 14 is fixed to the spindle 16 by the vacuum chuck 28. The spindle 16 is driven in a rotational direction centered on the R-axis, by an R-axis servo motor 29. A fluid bearing is provided between the X-axis movable portion 22 and the spindle 16, so that there is only a small amount of friction between the X-axis movable portion 22 and the spindle 16.

The tool rest 20 is supported by a Z-axis movable portion 30. The Z-axis movable portion 30 is driven in a Z-axis direction by a Z-axis servo motor 32, along a Z-axis guide 34 fixed to the base platform 24. A fluid bearing is provided between the Z-axis guide 34 and the Z-axis movable portion 30, so that there is only a small amount of friction between the Z-axis guide 34 and the Z-axis movable portion 30.

The active damper 10 is a vibration isolation apparatus, and reduces vibration transmitted from a floor surface 36 to the precision processing machine 12.

Figure 2:
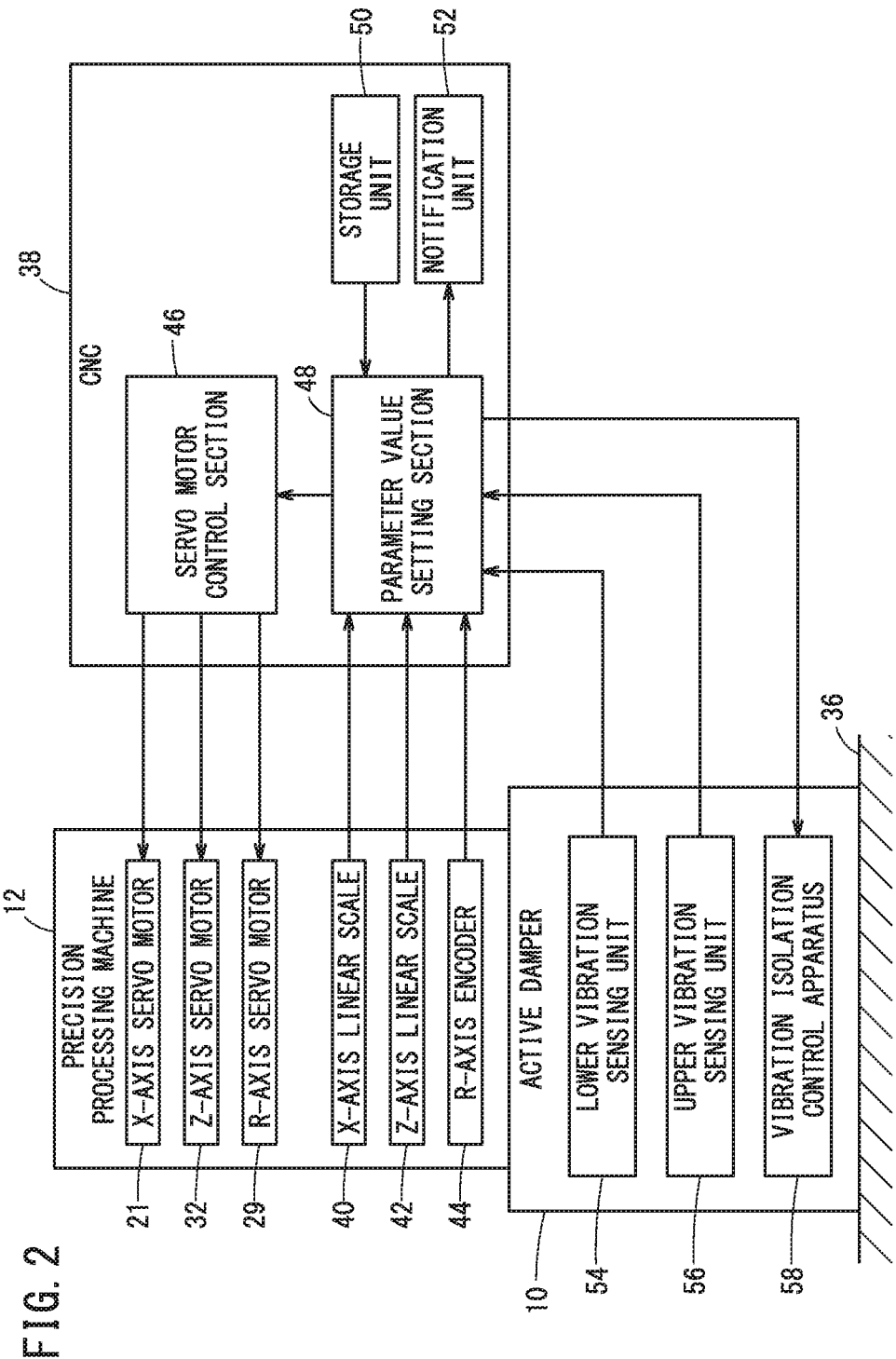
FIG. 2 is a control block diagram of the precision processing machine, the active damper, and a numerical controller.

FIG. 2 is a control block diagram of the precision processing machine 12, the active damper 10, and a numerical controller (numerical control apparatus) (referred to below as a CNC) 38.

The precision processing machine 12 includes, in addition to the configurational elements described above, an X-axis linear scale 40, a Z-axis linear scale 42, and an R-axis encoder 44. The X-axis linear scale 40 is a device that detects the position of the X-axis movable portion 22 on the X-axis guide 26. The Z-axis linear scale 42 is a device that detects the position of the Z-axis movable portion 30 on the Z-axis guide 34. The R-axis encoder 44 is a device that detects the rotational position of the spindle 16 around the R-axis. The resolution of the X-axis linear scale 40 and the Z-axis linear scale 42 is less than or equal to 10 nm, and the resolution of the R-axis encoder 44 is less than or equal to approximately 1/10,000 of a degree.

The active damper 10 includes a lower vibration sensing unit 54, an upper vibration sensing unit 56, and a vibration isolation control apparatus 58. The lower vibration sensing unit 54 is a device that senses vibration transmitted from the floor surface 36 to the active damper 10. The upper vibration sensing unit 56 is a device that senses vibration transmitted from the active damper 10 to the base platform 24. The vibration isolation control apparatus 58 is an apparatus that performs vibration isolation control of the active damper 10.

The CNC 38 is an apparatus that performs numerical control on the precision processing machine 12, according to a machining program. The CNC 38 is connected in a communicable manner to the vibration isolation control apparatus 58 of the active damper 10, in a wired or wireless manner. The CNC 38 includes a servo motor control section 46, a parameter value setting section 48, a storage unit 50, and a notification unit 52.

The servo motor control section 46 controls the X-axis servo motor 21 to position the X-axis movable portion 22 at a command position on the X-axis guide 26. Furthermore, the servo motor control section 46 controls the Z-axis servo motor 32 to position the Z-axis movable portion 30 at a command position on the Z-axis guide 34. Yet further, the servo motor control section 46 controls the R-axis servo motor 29 to position the spindle 16 at a command position around the R-axis. The X-axis servo motor 21, the Z-axis servo motor 32, and the R-axis servo motor 29 each include a servo amplifier that drives the servo motor.

The parameter value setting section 48 changes the values of various parameters for adjusting the vibration isolation characteristics of the active damper 10. By changing the values of various parameters, it is possible to adjust the vibration isolation characteristics of the active damper 10. By setting the values of various parameters according to a change in a condition of the floor surface 36 on which the active damper 10 is installed, a change of the weight or the center of gravity of the precision processing machine 12 disposed on the active damper 10, or a change in the surrounding vibrational environment, the vibration isolation characteristics of the active damper 10 is adjusted. The various parameters for adjusting the vibration isolation characteristics are ascent position target values, setting values concerning control feedback gain and filters, and the like, for example.

The storage unit 50 is a non-transitory tangible computer readable storage medium that stores N sets (N is a natural number greater than or equal to 2: N≥2) of candidate values, where each set of candidate values contains a candidate value of each type of parameter (i.e., each set contains the candidate values of the respective types of the parameters).

The notification unit 52 is an audio apparatus that outputs sound, a display apparatus that displays images, characters, and the like, or both an audio apparatus and a display apparatus. The notification unit 52 issues a notification to an operator of the precision processing machine 12, according to a command of the parameter value setting section 48.

The servo motor control section 46 and the parameter value setting section 48 are realized by having a processor such as a CPU of a computer execute a program stored in the non-transitory tangible computer readable storage medium.

[Parameter Value Setting Process]

Figure 3:
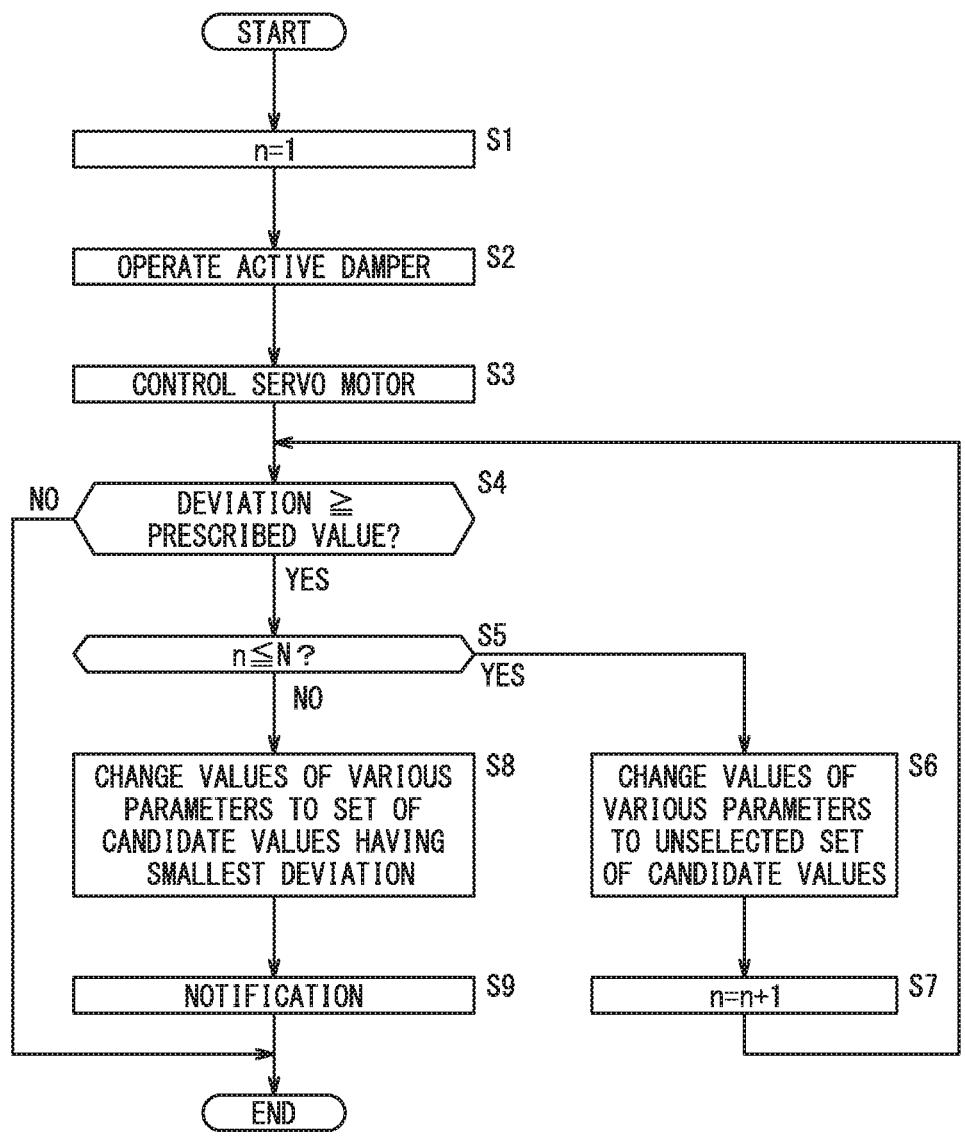
FIG. 3 is a flow chart showing a flow of a parameter value setting process.

FIG. 3 is a flow chart showing a flow of the parameter value setting process performed by the CNC 38. The parameter value setting process is performed when a change in the condition of the floor surface 36 on which the active damper 10 is installed, a change in the weight or center of gravity of the precision processing machine 12 placed on the active damper 10, or a change in the surrounding vibrational environment occurs. The operator of the precision processing machine 12 may manipulate an input section or the like (not shown in the drawings) to command the CNC 38 to execute the parameter value setting process.

The parameter value setting process is set according to vibration of the X-axis movable portion 22 relative to the X-axis guide 26, vibration of the Z-axis movable portion 30 relative to the Z-axis guide 34, and vibration of the spindle 16 relative to the R-axis, but in order to simplify the description below, a description is provided using an example in which the parameter value setting process is performed according to the vibration of the X-axis movable portion 22 relative to the X-axis guide 26. Furthermore, various parameter values are set even for an active damper 10 in a state at the time of factory shipping.

At step S1, the parameter value setting section 48 substitutes "1" for the variable n, and the process moves to step S2.

At step S2, the parameter value setting section 48 commands the vibration isolation control apparatus 58 of the active damper 10 to cause the active damper 10 to operate, and the process moves to step S3.

At step S3, the parameter value setting section 48 commands the servo motor control section 46 to control the X-axis servo motor 21 to stop the X-axis movable portion 22 at a command position on the X-axis guide 26, and the process moves to step S4. This control of the X-axis servo motor 21 continues until the parameter value setting process ends.

At step S4, the parameter value setting section 48 judges whether or not the magnitude of a deviation, which is the difference between the actual position and the command position of the X-axis movable portion 22 on the X-axis guide 26, is greater than or equal to a prescribed value (i.e., whether the deviation the prescribed value). The process moves to step S5 if the magnitude of this deviation is greater than or equal to the prescribed value, and the parameter value setting process ends if the magnitude of this deviation is less than the prescribed value.

At step S5, the parameter value setting section 48 judges whether the variable n is less than or equal to N. If the variable n is less than or equal to N, that is, if there is an unselected set of candidate values among the N sets of candidate values stored in the storage unit 50, the process moves to step S6. On the other hand, if the variable n is greater than N, that is, if there are no unselected sets of candidate values among the N sets of candidate values stored in the storage unit 50, the process moves to step S8.

At step S6, the parameter value setting section 48 selects one unselected set from among the N sets of candidate values stored in the storage unit 50 and changes the values of the various parameters to the candidate values of the selected set, and the process moves to step S7.

At step S7, the parameter value setting section 48 increments the variable n by one, and the process moves to step S4.

At step S8, the parameter value setting section 48 selects the set of candidate values that has the smallest deviation from among the N sets of candidate values that have been selected in the past and changes the values of the various parameters to the candidate values of the selected set, and the process moves to step S9.

At step S9, the parameter value setting section 48 controls the notification unit 52 to notify to the operator that the adjustment of the vibration isolation characteristics of the active damper 10 is not optimal, and ends the parameter value setting process.

[Operational Effect]

With the precision processing machine 12, since there is a very small amount of friction between the X-axis guide 26 and the X-axis movable portion 22, it is necessary to constantly drive the X-axis movable portion 22 with the X-axis servo motor 21 in order to stop the X-axis movable portion 22 at the command position on the X-axis guide 26. Therefore, even if the vibration isolation characteristics of the active damper 10 are set in a manner to reduce the vibration of the base platform 24, there are cases where the vibration of the X-axis movable portion 22 relative to the X-axis guide 26 cannot be sufficiently reduced. Conventionally, since the vibration isolation control apparatus 58 of the active damper 10 does not receive the information from the X-axis linear scale 40 of the precision processing machine 12, it has been impossible to adjust the vibration isolation characteristics in a manner to enable a sufficient reduction in the vibration of the X-axis movable portion 22 relative to the X-axis guide 26.

Therefore, the operator of the precision processing machine 12 used to set the values of the various parameters manually, but since there are many different types of parameters, significant amounts of time and experience were necessary to suitably adjust the vibration isolation characteristics. There is also an idea to provide a personal computer that communicates with both the precision processing machine 12 and the active damper 10 and to have this personal computer set the various parameter values, in order to reduce the burden on the operator of the precision processing machine 12. However, there is a problem that preparing a personal computer for the parameter setting process, which is performed infrequently, increases the cost.

Therefore, in the present embodiment, the parameter value setting process is performed by the CNC 38 that controls the precision processing machine 12. In the present embodiment, the CNC 38 is connected in a communicable manner with the vibration isolation control apparatus 58 of the active damper 10, in order to perform the parameter value setting process. Furthermore, in the present embodiment, the CNC 38 is provided with the parameter value setting section 48. When the magnitude of the deviation, which is the difference between the actual position and the command position of the X-axis movable portion 22 on the X-axis guide 26, is greater than or equal to the prescribed value during the operation of the active damper 10, the parameter value setting section 48 selects an unselected set of candidate values from among the N sets of candidate values stored in the storage unit 50 and changes the values of the various parameters to the selected set of candidate values. Furthermore, when the magnitude of the deviation, which is the difference between the actual position and the command position of the X-axis movable portion 22 on the X-axis guide 26, is less than the prescribed value during the operation of the active damper 10, the parameter value setting section 48 does not change the values of the various parameters. In this way, the vibration isolation characteristics of the active damper 10 can be adjusted in a manner to sufficiently reduce the vibration of the X-axis movable portion 22 relative to the X-axis guide 26.

Furthermore, in the present embodiment, even when the magnitude of the deviation, which is the difference between the actual position and the command position of the X-axis movable portion 22 on the X-axis guide 26, is greater than or equal to the prescribed value during the operation of the active damper 10, if there are no unselected sets of candidate values among the N sets of candidate values stored in the storage unit 50, the parameter value setting section 48 selects the set of candidate values having the smallest deviation from among the N sets of candidate values selected in the past and changes the values of the various parameters to the selected set of candidate values. In this way, even though the vibration isolation characteristics of the active damper 10 cannot be optimized, the vibration isolation characteristics of the active damper 10 can still be adjusted in a manner to reduce the vibration of the X-axis movable portion 22 relative to the X-axis guide 26 as much as possible.

In the present embodiment, when the set of candidate values having the smallest deviation from among the N sets of candidate values selected in the past is selected and the values of the various parameters are changed to the selected set of candidate values, the parameter value setting section 48 controls the notification unit 52 to issue a notification to the operator of the precision processing machine 12. The operator can be made aware that the vibration isolation characteristics of the active damper 10 are not optimal.

Second Embodiment

Figure 4:
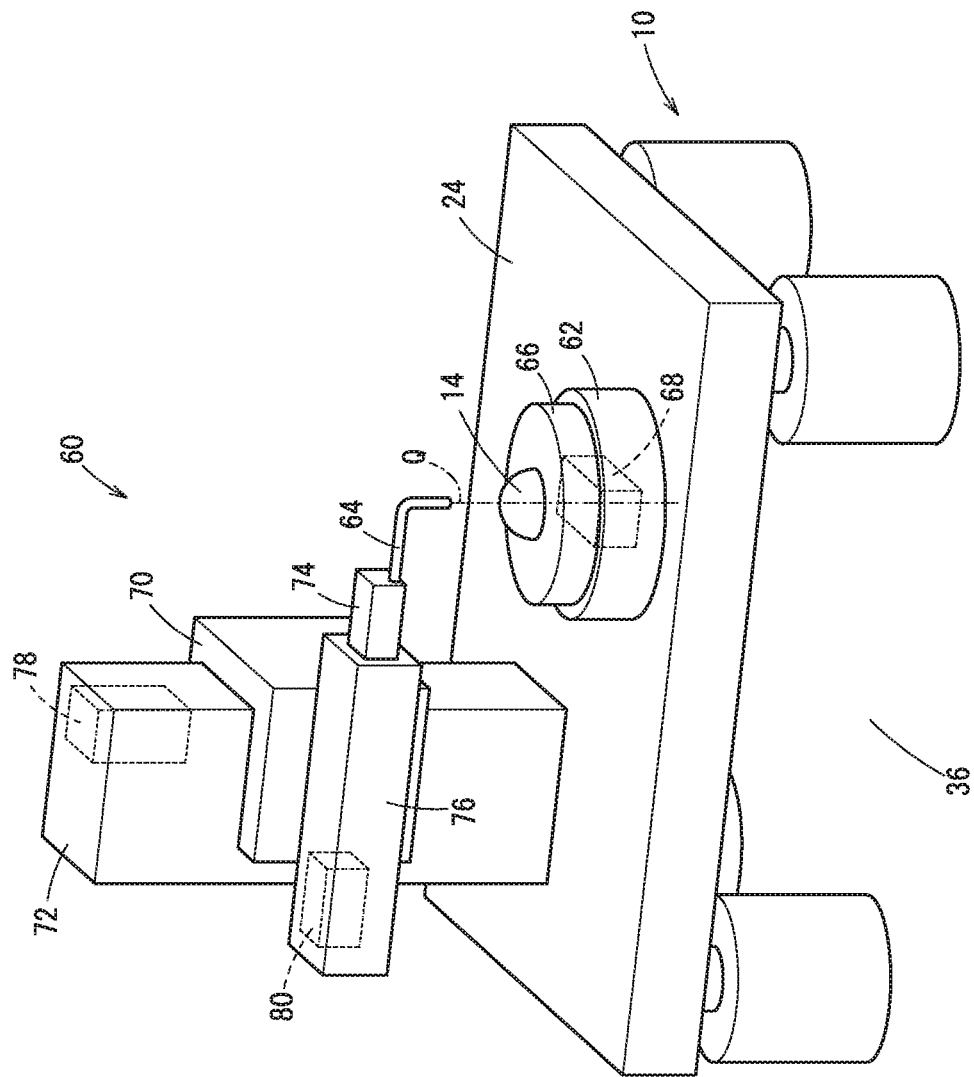
FIG. 4 is a schematic view of the precision measurement device that is loaded on the active damper.

FIG. 4 is a schematic view of a precision measurement device 60 placed on the active damper 10.

The precision measurement device 60 is a device that three-dimensionally measures the shape of the workpiece 14 with a precision of 10 nm or less. The precision measurement device 60 includes a rotating table 62 to which the workpiece 14 is fixed in an attachable/detachable manner, and a probe 64 that contacts the workpiece 14 during the three-dimensional measurement.

The rotating table 62 is supported by the base platform 24. The rotating table 62 includes a vacuum chuck 66, and has the workpiece 14 fixed thereto by the vacuum chuck 66. The rotating table 62 is driven in a rotational direction centered on a Q-axis by a Q-axis servo motor 68. A fluid bearing is provided between the base platform 24 and the rotating table 62, so that there is only a small amount of friction between the base platform 24 and the rotating table 62.

The probe 64 is supported by a Y-axis movable portion 70, a Y-axis guide 72, a Z-axis movable portion 74, and a Z-axis guide 76. The Y-axis movable portion 70 is driven in the Y-axis direction by a Y-axis servo motor 78, along the Y-axis guide 72 fixed to the base platform 24. The Z-axis movable portion 74 is driven in the Z-axis direction by a Z-axis servo motor 80, along the Z-axis guide 76 fixed to the Y-axis movable portion 70. The probe 64 is fixed to the Z-axis movable portion 74. A fluid bearing is provided between the Y-axis guide 72 and the Y-axis movable portion 70, so that there is only a small amount of friction between the Y-axis guide 72 and the Y-axis movable portion 70. A fluid bearing is provided between the Z-axis guide 76 and the Z-axis movable portion 74, so that there is only a small amount of friction between the Z-axis guide 76 and the Z-axis movable portion 74.

The active damper 10 is a vibration isolation apparatus, and reduces vibration transmitted from the floor surface 36 to the precision measurement device 60.

FIG. 5 is a control block diagram of the precision measurement device 60, the active damper 10, and a measurement control apparatus 82.

The precision measurement device 60 includes, in addition to the configurational elements described above, a Y-axis linear scale 84, a Z-axis linear scale 86, and a Q-axis encoder 88. The Y-axis linear scale 84 is a device that detects the position of the Y-axis movable portion 70 on the Y-axis guide 72. The Z-axis linear scale 86 is a device that detects the position of the Z-axis movable portion 74 on the Z-axis guide 76. The Q-axis encoder 88 is a device that detects the rotational position of the rotating table 62 around the Q-axis. The resolutions of the Y-axis linear scale 84 and the Z-axis linear scale 86 are less than or equal to 10 nm, and the resolution of the Q-axis encoder 88 is less than or equal to $1/10,000$ of a degree.

The active damper 10 used here is the same as the active damper 10 of the first embodiment. The measurement control apparatus 82 includes the servo motor control section 46, the parameter value setting section 48, the storage unit 50, and the notification unit 52, in the same manner as the CNC 38 of the first embodiment.

In the present embodiment, the measurement control apparatus 82 sets the values of the various parameters by performing a process that is similar to the parameter value setting process of the first embodiment.

Other Embodiments

In the first and second embodiments, the parameter value setting process is performed in a state where the movable portions (the spindle 16, X-axis movable portion 22, Z-axis movable portion 30, rotating table 62, Y-axis movable portion 70, and Z-axis movable portion 74) are stopped at the command positions by the servo motor control section 46. Instead, the parameter value setting process may be performed in a state where the movable portions are controlled to move. In a case where the movable portions are controlled to move as well, the values of the various parameters should be set such that the deviations between the command positions and the actual positions relative to the respective axes of the movable portions are less than the prescribed values. When the precision processing machine 12 and/or the precision measurement device 60 are processing and/or measuring the workpiece 14, the movable portions are moving. Therefore, by performing the parameter value setting process in a state where the movable portions are controlled to move, the vibration isolation characteristics of the active damper 10 can be set in a manner to further reduce the vibration of the movable portions relative to the axes during the processing and/or measuring.

Furthermore, in a case where the Z-axis movable portion 74 moves on the plurality of linear axes of the Y-axis guide 72 and the Z-axis guide 76, such as in the precision measurement device 60 of the second embodiment, the difference between the resultant position obtained by composition of the command positions on the respective linear axes and the resultant position obtained by composition of the actual positions of the Z-axis movable portion 74 on the respective linear axes may be used as the deviation.

Furthermore, with the precision processing machine 12 of the first embodiment, the parameter value setting process may be performed when the X-axis movable portion 22 and the Z-axis movable portion 30 are positioned within a range in which the X-axis movable portion 22 and the Z-axis movable portion 30 move on the X-axis guide 26 and the Z-axis guide 34 during the processing (machining) of the workpiece 14. For example, for the positional control of the X-axis movable portion 22 and the Z-axis movable portion 30, a high degree of positional precision is desired during the machining of the workpiece 14, but such a high degree of positional precision is not needed at the time of exchanging of the workpiece 14 or the tool 18. When the X-axis movable portion 22 and the Z-axis movable portion 30 are positioned within a range in which the X-axis movable portion 22 and the Z-axis movable portion 30 move on the X-axis guide 26 and the Z-axis guide 34 during the processing of the workpiece 14, the parameter value setting process is performed, whereby it is possible to further reduce the vibration during processing of the workpiece 14.

Furthermore, the vibration sensed by the lower vibration sensing unit 54 and the upper vibration sensing unit 56 may be used to judge the acceptability of the vibrational environment at a location where the active damper 10 is installed or to judge the acceptability of the vibration isolation characteristics of the active damper 10. Yet further, the vibration sensed by the lower vibration sensing unit 54 and the upper vibration sensing unit 56 and the vibration of each movable portion relative to the corresponding axis may be used in combination to judge the acceptability of the vibrational environment at a location where the active damper 10 is installed or to judge the acceptability of the vibration isolation characteristics of the active damper 10.

Technical Concepts Obtainable from the Embodiments

The following is a description of technical concepts that can be understood from the embodiments described above.

A method of setting a parameter for adjusting vibration isolation characteristics of a vibration isolation apparatus (10), performed by a control apparatus (38, 82), wherein a device (12, 60) that includes at least one axis and a movable portion driven by a servo motor (21, 29, 32, 68, 78, 80) on the axis is disposed on the vibration isolation apparatus, the control apparatus controls the device, and the control apparatus includes a storage unit (50) configured to store a plurality of sets of candidate values of parameters for adjusting the vibration isolation characteristics of the vibration isolation apparatus, wherein each of the sets of candidate values contains candidate values of respective types of the parameters, the parameter setting method including a servo motor control step of controlling the servo motor to position the movable portion at a command position; and a parameter value changing step of, when the magnitude of a deviation that is a difference between the command position and an actual position of the movable portion is greater than or equal to a prescribed value during operation of the vibration isolation apparatus, selecting an unselected set of candidate values from among the plurality of sets of candidate values and changing the values of the respective types of the parameters of the vibration isolation apparatus to the selected set of candidate values, and when the magnitude of the deviation is less than the prescribed value, not changing the values of the respective types of the parameters, wherein after the parameter value changing step is finished, the parameter value changing step is repeated until the magnitude of the deviation becomes less than the prescribed value. In this way, the vibration isolation characteristics of the vibration isolation apparatus can be adjusted such that it is possible to sufficiently reduce the vibration of the movable portion relative to the axis.

In the parameter setting method, the parameter value changing step includes, when the magnitude of the deviation is greater than or equal to the prescribed value and there are no unselected sets of candidate values, changing the values of the respective types of the parameters of the vibration isolation apparatus to the set of candidate values for which the deviation is smallest. In this way, even though the vibration isolation characteristics of the vibration isolation apparatus cannot be optimized, the vibration isolation characteristics of the vibration isolation apparatus can still be adjusted in a manner to reduce the vibration of the movable portion relative to the axis as much as possible.

The parameter setting method further includes a notification step of issuing a notification when the magnitude of the deviation is greater than or equal to the prescribed value and there are no unselected sets of candidate values. In this way, the operator of the device can be made aware that the vibration isolation characteristics of the vibration isolation apparatus are not optimal.

In the parameter setting method, the axis is a linear axis on which the movable portion is driven in a direction in which the axis extends, or a rotational axis around which the movable portion is driven in the rotational direction with the axis at the center, and the precision of the deviation is less than or equal to 10 nm, or is less than or equal to $\frac{1}{10,000}$ of a degree. In this way, it is possible to sufficiently reduce the vibration for a device such as a precision processing machine or a precision measurement device as well.

In the parameter setting method, the device is a processing machine that processes (machines) a workpiece (14), and the deviation is a difference between the command position and the actual position when the movable portion is positioned within a range in which the movable portion moves on the axis while the processing machine processes the workpiece. In this way, the vibration isolation characteristics of the vibration isolation apparatus can be adjusted in a manner to reduce the vibration of the movable portion relative to the axis during the processing by the processing machine.

In the parameter setting method, the axis is a linear axis on which the movable portion is driven in a direction in which the axis extends, and the deviation is a difference between the command position and the actual position when the servo motor is controlled so as to stop the movable portion at the command position within a range of the linear axis. In this way, the vibration isolation characteristics of the vibration isolation apparatus can be adjusted in a manner to sufficiently reduce the vibration of the movable portion relative to the axis, using deviation with a high precision.

In the parameter setting method, the axis is a linear axis on which the movable portion is driven in a direction in which the axis extends, the movable portion is driven on a plurality of linear axes, and the deviation is a difference between the command position and the actual position on each of the linear axes when the servo motor is controlled so as to move the movable portion to the command position on each of the linear axes. In this way, the vibration isolation characteristics of the vibration isolation apparatus can be adjusted in a manner to reduce the vibration of the movable portion relative to the axis when the movable portion is moving.

In the parameter setting method, the axis is a linear axis on which the movable portion is driven in a direction in which the axis extends, the movable portion is driven on a plurality of linear axes, and the deviation is a difference between a resultant position obtained by composition of the actual positions on the respective linear axes and a resultant position obtained by composition of the command positions on the respective linear axes when the servo motor is controlled so as to move the movable portion to the command position on each of the linear axes. In this way, the vibration isolation characteristics of the vibration isolation apparatus can be adjusted in a manner to reduce the vibration of the movable portion relative to the axis when the movable portion is moving.

A control apparatus (38, 82) for a device (12, 60) that includes at least one axis disposed on a vibration isolation apparatus (10) and a movable portion driven on the axis by a servo motor (21, 29, 32, 68, 78, 80), the control apparatus including a storage unit (50) configured to store a plurality of sets of candidate values of parameters for adjusting vibration isolation characteristics of the vibration isolation apparatus, wherein each of the sets of candidate values contains candidate values of respective types of the parameters; a servo motor control section (46) configured to control the servo motor to position the movable portion at a command position; and a parameter value setting section (48) configured to, when the magnitude of a deviation that is a difference between the command position and an actual position of the movable portion is greater than or equal to a prescribed value during operation of the vibration isolation apparatus, select an unselected set of candidate values from among the plurality of sets of candidate values and change the values of the respective types of the parameters of the vibration isolation apparatus to the selected set of candidate values and, when the magnitude of the deviation is less than the prescribed value, not change the values of the respective types of the parameters, wherein the parameter value setting section is configured to repeat changing of the values of the respective types of the parameters until the magnitude of the deviation becomes less than the prescribed value. In this way, the vibration isolation characteristics of the vibration isolation apparatus can be adjusted in a manner to sufficiently reduce the vibration of the movable portion relative to the axis.

In the control apparatus, when the magnitude of the deviation is greater than or equal to the prescribed value and there are no unselected sets of candidate values, the parameter value setting section changes the values of the respective types of the parameters of the vibration isolation apparatus to the set of candidate values for which the deviation is smallest. In this way, even though the vibration isolation characteristics of the vibration isolation apparatus cannot be optimized, the vibration isolation characteristics of the vibration isolation apparatus can still be adjusted in a manner to reduce the vibration of the movable portion relative to the axis as much as possible.

The control apparatus further includes a notification unit (52) configured to issue a notification when the magnitude of the deviation is greater than or equal to the prescribed value and there are no unselected sets of candidate values. In this way, the operator of the device can be made aware that the vibration isolation characteristics of the vibration isolation apparatus are not optimal.

In the control apparatus, the axis is a linear axis on which the movable portion is driven in a direction in which the axis extends, or a rotational axis around which the movable portion is driven in the rotational direction with the axis at the center, and the precision of the deviation is less than or equal to 10 nm, or is less than or equal to $1/10,000$ of a degree. In this way, it is possible to sufficiently reduce the vibration for a device such as a precision processing machine or a precision measurement device as well.

In the control apparatus, the device is a processing machine that processes (machines) a workpiece (14), and the deviation is a difference between the command position and the actual position when the movable portion is positioned within a range in which the movable portion moves on the axis while the processing machine machines the workpiece. In this way, the vibration isolation characteristics of the vibration isolation apparatus can be adjusted in a manner to reduce the vibration of the movable portion relative to the axis during the processing by the processing machine.

In the control apparatus, the axis is a linear axis on which the movable portion is driven in a direction in which the axis extends, and the deviation is a difference between the command position and the actual position when the servo motor is controlled so as to stop the movable portion at the command position within a range of the linear axis. In this way, the vibration isolation characteristics of the vibration isolation apparatus can be adjusted in a manner to sufficiently reduce the vibration of the movable portion relative to the axis, using deviation with a high precision.

In the control apparatus, the axis is a linear axis on which the movable portion is driven in a direction in which the axis extends, the movable portion is driven on a plurality of linear axes, and the deviation is a difference between a resultant position obtained by composition of the actual positions on the respective linear axes and a resultant position obtained by composition of the command positions on the respective linear axes when the servo motor is controlled so as to move the movable portion to the command position on each of the linear axes. In this way, the vibration isolation characteristics of the vibration isolation apparatus can be adjusted in a manner to reduce the vibration of the movable portion relative to the axis when the movable portion is moving.

The present invention is not particularly limited to the embodiment described above, and various modifications are possible without departing from the essence and gist of the present invention.

What is claimed is:

1. A method of setting a parameter for adjusting vibration isolation characteristics of a vibration isolation apparatus, performed by a control apparatus, wherein
    a device that includes at least one axis and a movable portion driven by a servo motor on the axis is disposed on the vibration isolation apparatus,
    the control apparatus controls the device, and
    the control apparatus includes a storage unit configured to store a plurality of sets of candidate values of parameters for adjusting the vibration isolation characteristics of the vibration isolation apparatus, wherein each of the sets of candidate values contains candidate values of respective types of the parameters, the parameter setting method comprising:
    a servo motor control step of controlling the servo motor to position the movable portion at a command position; and
    a parameter value changing step of, when a magnitude of a deviation that is a difference between the command position and an actual position of the movable portion is greater than or equal to a prescribed value during operation of the vibration isolation apparatus, selecting an unselected set of candidate values from among the plurality of sets of candidate values and changing values of the respective types of the parameters of the vibration isolation apparatus to the selected set of candidate values, and when the magnitude of the deviation is less than the prescribed value, not changing the values of the respective types of the parameters, wherein
    after the parameter value changing step is finished, the parameter value changing step is repeated until the magnitude of the deviation becomes less than the prescribed value.

2. The parameter setting method according to claim 1, wherein
    the parameter value changing step includes, when the magnitude of the deviation is greater than or equal to the prescribed value and there are no unselected sets of candidate values, changing the values of the respective types of the parameters of the vibration isolation apparatus to the set of candidate values for which the deviation is smallest.

3. The parameter setting method according to claim 2, further comprising:
    a notification step of issuing a notification when the magnitude of the deviation is greater than or equal to the prescribed value and there are no unselected sets of candidate values.

4. The parameter setting method according to claim 1, wherein
    the axis is a linear axis on which the movable portion is driven in a direction in which the axis extends, or a rotational axis around which the movable portion is driven in a rotational direction with the axis at a center, and
    precision of the deviation is less than or equal to 10 nm, or is less than or equal to $1/10,000$ of a degree.

5. The parameter setting method according to claim 1, wherein
    the device is a processing machine that machines a workpiece, and the deviation is a difference between the command position and the actual position when the movable portion is positioned within a range in which the movable portion moves on the axis while the processing machine machines the workpiece.

6. The parameter setting method according to claim 1, wherein
the axis is a linear axis on which the movable portion is driven in a direction in which the axis extends, and
the deviation is a difference between the command position and the actual position when the servo motor is controlled so as to stop the movable portion at the command position within a range of the linear axis.

7. The parameter setting method according to claim 1, wherein
the axis is a linear axis on which the movable portion is driven in a direction in which the axis extends,
the movable portion is driven on a plurality of linear axes, and
the deviation is a difference between the command position and the actual position on each of the linear axes when the servo motor is controlled so as to move the movable portion to the command position on each of the linear axes.

8. The parameter setting method according to claim 1, wherein
the axis is a linear axis on which the movable portion is driven in a direction in which the axis extends,
the movable portion is driven on a plurality of linear axes, and
the deviation is a difference between a resultant position obtained by composition of the actual positions on the respective linear axes and a resultant position obtained by composition of the command positions on the respective linear axes when the servo motor is controlled so as to move the movable portion to the command position on each of the linear axes.

9. A control apparatus for a device that includes at least one axis disposed on a vibration isolation apparatus and a movable portion driven on the axis by a servo motor, the control apparatus comprising:
a storage unit configured to store a plurality of sets of candidate values of parameters for adjusting vibration isolation characteristics of the vibration isolation apparatus, wherein each of the sets of candidate values contains candidate values of respective types of the parameters;
a servo motor control section configured to control the servo motor to position the movable portion at a command position; and
a parameter value setting section configured to, when a magnitude of a deviation that is a difference between the command position and an actual position of the movable portion is greater than or equal to a prescribed value during operation of the vibration isolation apparatus, select an unselected set of candidate values from among the plurality of sets of candidate values and change values of the respective types of the parameters of the vibration isolation apparatus to the selected set of candidate values and, when the magnitude of the deviation is less than the prescribed value, not change the values of the respective types of the parameters, wherein
the parameter value setting section is configured to repeat changing of the values of the respective types of the parameters until the magnitude of the deviation becomes less than the prescribed value.

10. The control apparatus according to claim 9, wherein
when the magnitude of the deviation is greater than or equal to the prescribed value and there are no unselected sets of candidate values, the parameter value setting section changes the values of the respective types of the parameters of the vibration isolation apparatus to the set of candidate values for which the deviation is smallest.

11. The control apparatus according to claim 10, further comprising:
a notification unit configured to issue a notification when the magnitude of the deviation is greater than or equal to the prescribed value and there are no unselected sets of candidate values.

12. The control apparatus according to claim 9, wherein
the axis is a linear axis on which the movable portion is driven in a direction in which the axis extends, or a rotational axis around which the movable portion is driven in a rotational direction with the axis at a center, and
precision of the deviation is less than or equal to 10 nm, or is less than or equal to $1/10,000$ of a degree.

13. The control apparatus according to claim 9, wherein
the device is a processing machine that machines a workpiece, and
the deviation is a difference between the command position and the actual position when the movable portion is positioned within a range in which the movable portion moves on the axis while the processing machine machines the workpiece.

14. The control apparatus according to claim 9, wherein
the axis is a linear axis on which the movable portion is driven in a direction in which the axis extends, and
the deviation is a difference between the command position and the actual position when the servo motor is controlled so as to stop the movable portion at the command position within a range of the linear axis.

15. The control apparatus according to claim 9, wherein
the axis is a linear axis on which the movable portion is driven in a direction in which the axis extends,
the movable portion is driven on a plurality of linear axes, and
the deviation is a difference between a resultant position obtained by composition of the actual positions on the respective linear axes and a resultant position obtained by composition of the command positions on the respective linear axes when the servo motor is controlled so as to move the movable portion to the command position on each of the linear axes.

\* \* \* \* \*